US010712737B2

(12) United States Patent
Downor

(10) Patent No.: US 10,712,737 B2
(45) Date of Patent: Jul. 14, 2020

(54) METHOD AND SYSTEM FOR EFFICIENT DYNAMIC ALARM CONSTRUCTION

(71) Applicant: General Electric Company, Schenectady, NY (US)

(72) Inventor: Johnny Downor, Salem, VA (US)

(73) Assignee: General Electric Company, Schenectady, NY (US)

( * ) Notice: Subject to any disclaimer, the term of this patent is extended or adjusted under 35 U.S.C. 154(b) by 30 days.

(21) Appl. No.: 15/531,201

(22) PCT Filed: Dec. 1, 2014

(86) PCT No.: PCT/US2014/067858
§ 371 (c)(1),
(2) Date: May 26, 2017

(87) PCT Pub. No.: WO2016/089342
PCT Pub. Date: Jun. 9, 2016

(65) Prior Publication Data
US 2017/0329322 A1 Nov. 16, 2017

(51) Int. Cl.
G05B 23/02 (2006.01)
G06F 9/448 (2018.01)
G05B 19/042 (2006.01)

(52) U.S. Cl.
CPC ..... *G05B 23/0294* (2013.01); *G05B 19/0425* (2013.01); *G05B 23/0272* (2013.01); *G06F 9/4492* (2018.02)

(58) Field of Classification Search
CPC ............ G05B 23/0294; G05B 23/0272; G05B 19/0425
See application file for complete search history.

(56) References Cited

U.S. PATENT DOCUMENTS 5,369,756 A  11/1994 Imura et al.
2006/0206860 A1* 9/2006 Dardinski ............. G05B 15/02
717/105

(Continued)

FOREIGN PATENT DOCUMENTS

EP  2 530 546 A2  12/2012

OTHER PUBLICATIONS

Kang et al., A Methodology for Evaluating Alarm-Processing Systems Using Informational Entropy-Based Measure and the Analytic Hierarchy Process, Dec. 1999, IEEE Transactions on Nuclear Science, vol. 46, No. 6, pp. 2269-2280 (Year: 1999).*

(Continued)

*Primary Examiner* — Toan M Le
(74) *Attorney, Agent, or Firm* — Armstrong Teasdale LLP

(57) ABSTRACT

Described herein are systems and methods of dynamically displaying a network of alarms. This can comprise establishing a first hierarchy of a plurality of alarms in an alarm server, the plurality of alarms comprising the network of alarms; receiving a state of the alarms over a network, wherein the state of the alarms are received from one or more Object Linking and Embedding (OLE) for Process Control (OPC) Unified Architecture (UA) clients through a standard interface of an Object Linking and Embedding for Process Control (OPC) Alarms and Events (OPC AE) protocol, communicating with the alarm server; dynamically changing the first hierarchy of the alarms based on the state of the alarms to obtain a second hierarchy of the alarms; and presenting, on a display in communication with the alarm server, a second list of alarms to an operator based on the second hierarchy.

20 Claims, 8 Drawing Sheets

(56) References Cited

U.S. PATENT DOCUMENTS

2008/0079560 A1 4/2008 Hall et al.
2011/0010654 A1* 1/2011 Raymond .............. G06N 5/025
715/772

OTHER PUBLICATIONS

Hannelius, T., et al., "Roadmap to adopting OPC UA," IEEE International Conference on Industrial Informatics (INDIN), pp. 756-761 (Jul. 13-16, 2008).
International Search Report and Written Opinion issued in connection with corresponding Application No. PCT/US2014/067858 dated Aug. 3, 2015.
International Preliminary Report on Patentability issued in connection with corresponding PCT Application No. PCT/US2014/067858 dated Jun. 6, 2017.

* cited by examiner

METHOD AND SYSTEM FOR EFFICIENT DYNAMIC ALARM CONSTRUCTION

TECHNICAL FIELD

Aspects of the disclosure relate generally to alarm management, and more particularly, to managing alarms of monitored equipment or assets, such as equipment of a power plant.

BACKGROUND

Certain systems, such as industrial control systems, may provide for alarm and alert monitoring and interaction capabilities for various types of devices, such as sensors, pumps, valves, and the like. However, the monitoring and interaction capabilities are often times controlled by distributed control systems provided by a variety of manufacturers. Accordingly, presenting these monitoring and interaction capabilities may be complex, costly, and time consuming.

Existing systems make use of individual alarm states that are summed up or evaluated over different application categories and across a hierarchy. This is done according to predefined logic to ensure that the highest priority alarm prevails over all other contributing alarms. In such applications, any change of an alarm value leads to the recalculation of the state of the sum of all higher priority alarms in the category. However, these systems do not change the hierarchical relationship of alarms dynamically.

Therefore, systems and methods are desired that overcome challenges in the art, some of which are described above.

SUMMARY

A reduced number of alarms can be presented to an operator, providing the most critical alarm first while suppressing insignificant alarms within a network of alarms. This provides a more effective method for alarm reduction as compared with traditional methods that output alarms based on the order they are received in time. This method is time-independent and uses the knowledge of the configuration and hierarchy of the alarms to construct the alarm network based on the state of alarms.

Described herein are methods of dynamically displaying a network of alarms. One embodiment of the method comprises establishing a first hierarchy of a plurality of alarms in an alarm server, the plurality of alarms comprising the network of alarms; receiving, by the alarm server, a state of the alarms over a network, wherein the state of the alarms are received from one or more Object Linking and Embedding (OLE) for Process Control (OPC) Unified Architecture (UA) clients through a standard interface of an Object Linking and Embedding for Process Control (OPC) Alarms and Events (OPC AE) protocol, communicating with the alarm server; dynamically changing, by the alarm server, the first hierarchy of the alarms based on the state of the alarms to obtain a second hierarchy of the alarms; and presenting, on a display in communication with the alarm server, a second list of alarms to an operator based on the second hierarchy.

Alternatively or optionally, the method can further include presenting a first list of alarms to the operator based on the state of the alarms and the first hierarchy.

Generally, the network of alarms comprises a plurality of alarms connected with each other. For example, the network of alarms can comprise series and in parallel connections between the alarms.

Generally, the state of the alarms comprises an availability of the alarms in the network of alarms.

Alternatively or optionally, the second list of the alarms can comprise less alarms than the first list of the alarms.

Alternatively or optionally, the method step of establishing a first hierarchy of a plurality of alarms in an alarm server, said plurality of alarms comprising the network of alarms can comprise identifying each alarm as having a parent, child or orphan relationship.

Alternatively or optionally, the method step of dynamically changing, by the alarm server, the first hierarchy of the alarms based on the state of the alarms to obtain a second hierarchy of the alarms can comprise changing one or more of the parent, child or orphan relationships identified in the first hierarchy of alarms.

Alternatively or optionally, the method step of presenting, on the display in communication with the alarm server, a second list of alarms to an operator based on the second hierarchy can comprise presenting those alarms that have a parent or orphan relationship in the second hierarchy.

Also described herein are industrial process control systems. One embodiment of such a system comprises a computing device having at least a processor and a memory, wherein the processor executes computer-executable instructions stored in the memory that cause the processor to: establish a first hierarchy of a plurality of alarms in an alarm server, the plurality of alarms comprising the network of alarms; receive a state of the alarms over a network, wherein the state of the alarms are received from one or more Object Linking and Embedding (OLE) for Process Control (OPC) Unified Architecture (UA) clients through a standard interface of an Object Linking and Embedding for Process Control (OPC) Alarms and Events (OPC AE) protocol, communicating with the computing device; dynamically change the first hierarchy of the alarms based on the received state of the alarms to obtain a second hierarchy of the alarms; and present, on a display in communication with the computing device, a second list of alarms to an operator based on the second hierarchy.

In one aspect, the computing device of the system can comprise an alarm server.

Alternatively or optionally, the system can further comprise the processor executing computer-executable instructions stored in the memory that cause the processor to present a first list of alarms to the operator based on the state of the alarms and the first hierarchy. In one aspect, the second list of the alarms comprises less alarms than the first list of the alarms.

Alternatively of optionally, the system establishing a first hierarchy of a plurality of alarms in an alarm server, the plurality of alarms comprising the network of alarms, can comprise identifying each alarm as having a parent, child or orphan relationship.

Alternatively of optionally, the system dynamically changing, by the alarm server, the first hierarchy of the alarms based on the state of the alarms to obtain a second hierarchy of the alarms can comprise changing one or more of the parent, child or orphan relationships identified in the first hierarchy of alarms.

Alternatively of optionally, the system, wherein presenting, on the display in communication with the alarm server, a second list of alarms to an operator based on the second hierarchy comprises presenting those alarms that have a parent or orphan relationship in the second hierarchy.

Yet another aspect of the disclosure comprises a non-transitory computer-readable medium comprising computer-executable instructions for dynamically displaying a network of alarms, said instructions comprising instruction for: establishing a first hierarchy of a plurality of alarms, said plurality of alarms comprising the network of alarms; receiving a state of the alarms over a network, wherein the state of the alarms are received from one or more Object Linking and Embedding (OLE) for Process Control (OPC) Unified Architecture (UA) clients through a standard interface of an Object Linking and Embedding for Process Control (OPC) Alarms and Events (OPC AE) protocol, communicating with the alarm server; dynamically changing the first hierarchy of the alarms based on the state of the alarms to obtain a second hierarchy of the alarms; and presenting, on a display a second list of alarms to an operator based on the second hierarchy.

In one aspect, the computer-executable instructions are executed by an alarm server.

Alternatively of optionally, the computer-readable medium instructions of establishing a first hierarchy of a plurality of alarms, said plurality of alarms comprising the network of alarms, comprises identifying each alarm as having a parent, child or orphan relationship and wherein dynamically changing the first hierarchy of the alarms based on the state of the alarms to obtain a second hierarchy of the alarms can comprise changing one or more of the parent, child or orphan relationships identified in the first hierarchy of alarms.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
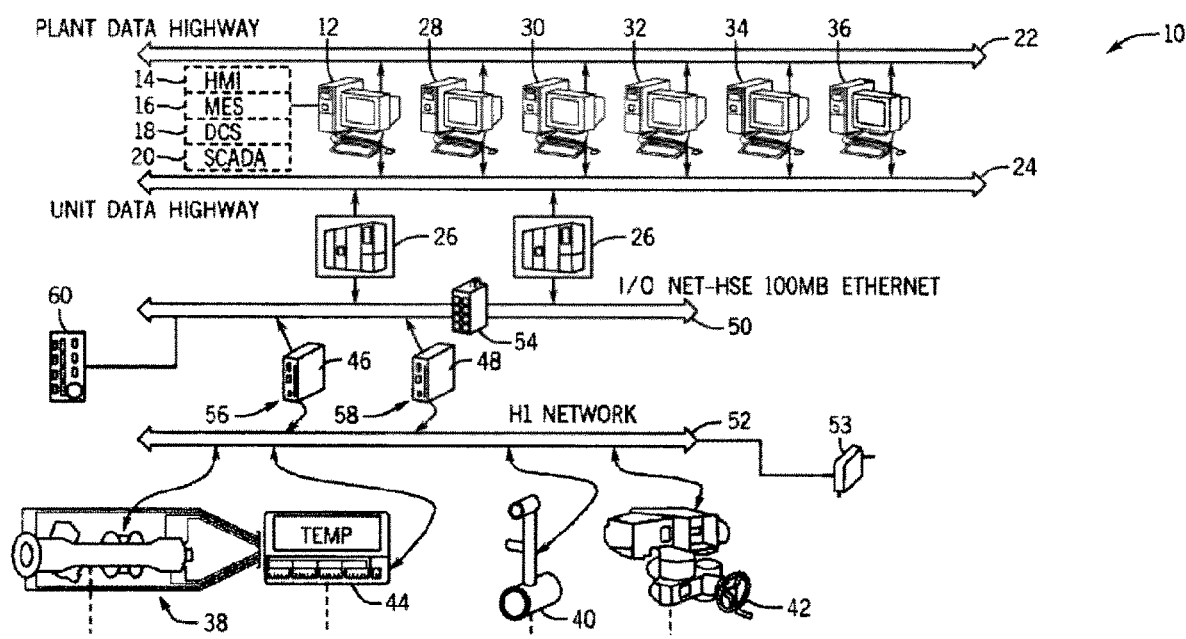
FIG. 1 illustrates an exemplary embodiment of an industrial process control system.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Turning to FIG. 1, an embodiment of an industrial process control system 10 is depicted. The control system 10 may include a computer 12 suitable for executing a variety of field device configuration and monitoring applications, and for providing an operator interface through which an engineer or technician may monitor the components of the control system 10. The computer 12 may be any type of computing device suitable for running software applications, such as a laptop, a workstation, a tablet computer, or a handheld portable device (e.g., personal digital assistant or cell phone). Indeed, the computer 12 may include any of a variety of hardware and/or operating system platforms. In accordance with one embodiment, the computer 12 may host an industrial control software, such as, for example, a human-machine interface (HMI) software 14, a manufacturing execution system (MES) 16, a distributed control system (DCS) 18, and/or a supervisor control and data acquisition (SCADA) system 20, and the like. For example, the computer 12 may host the ControlST™ software, available from General Electric Co., of Schenectady, N.Y.

Further, the computer 12 can be communicatively connected to a plant data highway 22 suitable for enabling communication between the depicted computer 12 and other computers 12 in the plant. Indeed, the industrial control system 10 may include multiple computers 12 interconnected through the plant data highway 22. The computer 12 may be further communicatively connected to a unit data highway 24, suitable for communicatively coupling the computer 12 to industrial controllers 26. The system 10 may include other computers coupled to the plant data highway 22 and/or the unit data highway 24. For example, embodiments of the system 10 may include a computer 28 that executes a virtual controller, a computer 30 that hosts an Ethernet Global Data (EGD) configuration server, an Object Linking and Embedding for Process Control (OPC) Data Access (DA) server, an alarm server, or a combination thereof, a computer 32 hosting a General Electric Device System Standard Message (GSM) server, a computer 34 hosting an OPC Alarm and Events (AE) server, a computer 36 hosting an alarm viewer, and the like. Other computers coupled to the plant data highway 22 and/or the unit data highway 24 may include computers hosting Cimplicity™, ControlST™, and Toolbox ST™.

The system 10 may include any number and suitable configuration of industrial controllers 26. For example, in some embodiments the system 10 may include one industrial controller 26 or two, three, or more industrial controllers 26 for redundancy. The industrial controllers 26 may enable control logic useful in automating a variety of plant equipment, such as a turbine system 38, a valve 40, and a pump 42. Indeed, the industrial controller 26 may communicate with a variety of devices, including but not limited to temperature sensors 44, flow meters, pH sensors, temperature sensors, vibration sensors, clearance sensors (e.g., measuring distances between a rotating component and a stationary component), and pressure sensors. The industrial controller 26 may further communicate with electric actuators, switches (e.g., Hall switches, solenoid switches, relay switches, limit switches), and so forth.

In the depicted embodiment, the turbine system 38, the valve 40, the pump 42, and the temperature sensor 44 are communicatively interlinked to the automation controller 26 by using linking devices 46 and 48 suitable for interfacing between an I/O network 50 and a field network 52. In some embodiments, a linking device, such as the linking device 48, may be coupled to the I/O network through a switch 54. In such an embodiment, other components coupled to the I/O network 50, such as one of the industrial controllers 26, may also be coupled to the switch 54. Accordingly, data transmitted and received through the I/O network 50, such as a 100 Megabit (MB) high speed Ethernet (HSE) network, may in turn be transmitted and received by the field network 52, such as a 31.25 kilobit/sec network. That is, the linking devices 46 and 48 may act as bridges between the I/O network 50 and the field network 52. Accordingly, a variety of devices may be linked to the industrial controller 26 and to the computer 12. For example, the devices, such as the turbine system 38, the valve 40, the pump 42, and the temperature sensor 44, may include industrial devices that include support for the field bi-directional communications protocol. The devices 38, 40, 42, and 44 may include support for communication protocols such as those included in the HART® Communications Foundation (HCF) protocol, the Profibus Nutzer Organization e.V. (PNO) protocol, the Foundation H1 protocol, and the like.

Each of the linking devices 46 and 48 may include one or more segment ports 56 and 58 useful in segmenting the field network 52. For example, the linking device 46 may use the segment port 56 to communicatively couple with the devices 38 and 44, while the linking device 48 may use the segment port 58 to communicatively couple with the devices 40 and 42. Distributing the input/output between the devices 38, 44, 40, and 42 by using, for example, the segment ports 56 and 58, may enable a physical separation useful in maintaining fault tolerance, redundancy, and improving communications time. In some embodiments, additional devices may be coupled to the I/O network 50. For example, in one embodiment an I/O pack 60 may be coupled to the I/O network 50.

Figure 2:
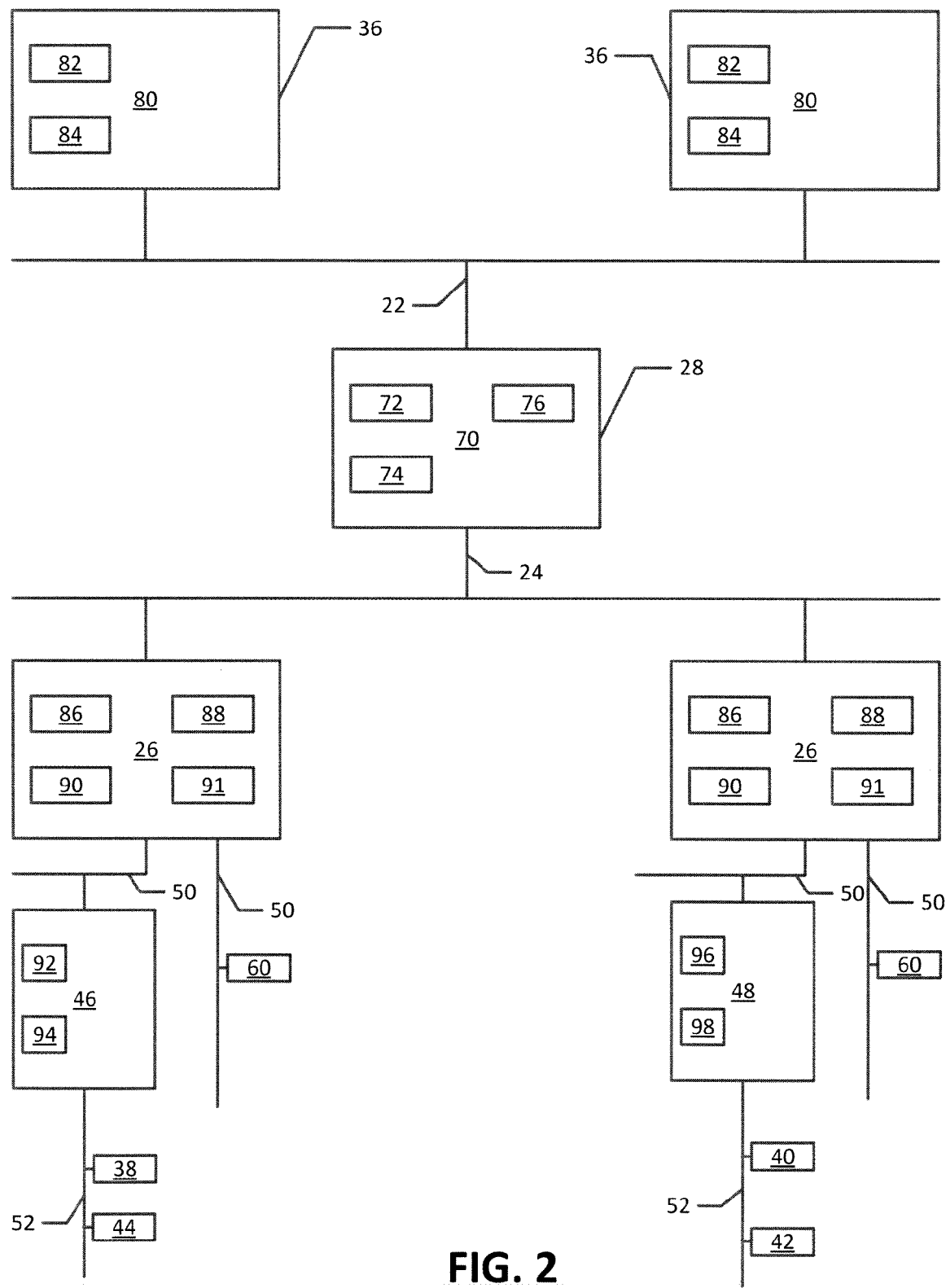
FIG. 2 depicts a block diagram of an embodiment of the system depicting various components in further detail.

In some embodiments, the devices 38, 40, 42, and 44 may provide data, such as alerts, to the system 10. These alerts may be handled in accordance with the embodiments described below. FIG. 2 depicts a block diagram of an embodiment of the system 10 depicting various components in further detail. As described above, the system 10 may include an alarm server 70, executed on the computer 28, coupled to the plant data highway 22 and the unit data highway 24. The computer 28 may include a memory 72, such as non-volatile memory and volatile memory, and a processor 74, to facilitate execution of the alarm server 70. The alarm server 70 may execute an alarm process 76 for receiving, processing, and responding to alarms received from the controllers 26.

The system 10 may include additional computers 36 coupled to the plant data highway 22 that may execute alarm viewers 80. The alarm viewers 80 may enable a user to view and interact with the alarms processed by the alarm server 70. The computers 36 may each include a memory 82 and a processor 84 for executing the alarm viewer 80. Additionally, in some embodiments, the alarm viewers 80 may be executed on the computer 28 or any of the computers described above in FIG. 1. The alarm server 70 may communicate with the alarm viewers 80 using any suitable alarm data protocol interpretable by the alarm viewers 80.

As described above, the controllers 26 are coupled to the unit data highway 24, and the controllers 26 may communicate with the alarm server 70 over the unit data highway 24. For example, in one embodiment, the controllers 26 and alarm server 70 may communicate using a serial data interface (SDI) alarm protocol. The controllers 26 may each include a memory 86 and a processor 88 for executing the functions of the controllers 26. In one embodiment, the controllers 26 may execute a sequence of events (SOE) process 90 and an alarm process 91. As mentioned above, the controllers 26 may be coupled to the I/O pack 60 over the I/O network 50. In one embodiment, the I/O pack 60 may communicate with the controllers 26 using the ADL protocol.

As also described above, the controllers 26 may be coupled to linking devices 46 and 48 through an I/O network 50. The linking devices 46 and 48 may communicate with the controllers 26 over the I/O network 50. The linking devices 46 and 48 may be coupled to the field network 52, and one linking device 46 may be coupled to devices 38 and 44 and another linking device 48 may be coupled to device 40 and 42. The linking device 46 may include a memory 92, such as volatile and non-volatile memory, and a processor 94, and the linking device 48 may include a memory 96, such as volatile and non-volatile memory, and a processor 98. In one embodiment, the linking devices 46 and 48 may communicate with the controllers 26 using various protocols as described herein.

The system 10 may enable alarm and diagnostic information to be communicated from the various devices to a user, such as through the HMI 14 and the alarm viewers 80. For example, the devices 38, 40, 42, and 44 may provide an alarm to the controller 26. The alarm may be provided from the controller 26 to the alarm server 70, which may process the alarm and provide information to the HMI 14, the alarm viewers 80, or any other computers coupled to the unit data highway 24 or plant data highway 22.

As shown in FIGS. 1 and 2, devices (e.g., 38, 40, 42, 44) can provide an alarm or alert data to the controller(s) 26. For example, the alarm or alert data may include process alarm data, sequence of events data, process holds data, process events data, and/or diagnostic alarm data. Diagnostic alarms are generated by predetermined conditions that are not defined by a user. Process alarms are generated by user-defined conditions configured in the industrial process control system 10.

Process alarms may include Boolean alarms, analog process alarms, Boolean process events, and Boolean process holds. The Boolean alarms are triggered upon an alarm property of the device (e.g., 38, 40, 42, 44) transitioning from "true" to "false" or from "false" to "true". Analog process alarms may include bad quality alarming, deviation hysteresis alarming, multi-level high and low threshold alarming, and rate of change hysteresis alarming. Additionally, Boolean process holds restrict sequences of application code from being run until certain events occur by monitoring for a device's hold variable reaching a "true" state. Upon reaching the "true" state, the next phase of the application code sequence may be executed. Finally, IO pack diagnostic alarms trigger upon detection of unusual circumstances of the IO pack internal variables, which are variables that illustrate how a device is functioning. The IO pack sequence of events provides a time stamped alert each time a configured control variable changes.

The controller(s) 26 provide controller diagnostic alarm data, sequence of event data, process alarm data, and/or IO pack diagnostic alarm data to a configuration system. In some embodiments, the configuration system may be ToolboxST available from General Electric Co., of Schenectady, N.Y. Controller diagnostic alarms are triggered upon the controller(s) 28 detecting unusual circumstances. The configuration system may be used to configure the alarm and alert settings for each of the alarm or alert data mentioned above. Additionally, the controller(s) 26 can provide the process alarm data, controller diagnostic alarm data, sequence of events data, and/or IO pack diagnostic alarm data to the alarm server 70.

Boolean process alarms may be removed (i.e., no longer shown as a triggered alarm) by a networked client acknowledging the alarm, resetting the alarm values to normal, or instructing the alarm to reset. Boolean process events may be removed upon a networked client acknowledging the event, and Boolean process holds may be removed upon a networked client acknowledging the hold or instructing the hold to reset, or the hold's process values returning to a normal state.

Additionally, diagnostic alarms may be removed upon a networked client acknowledging the alarm or resetting the alarm, or the alarm returning to a normal state. IO pack sequences of events may be removed upon the sequence of events being acknowledged by a networked client. With regard to the controller(s) 26, the controller diagnostics may be removed upon a networked client acknowledging the alarm or instructing the alarm to reset, or the alarm returning to a normal state.

Figure 3A:
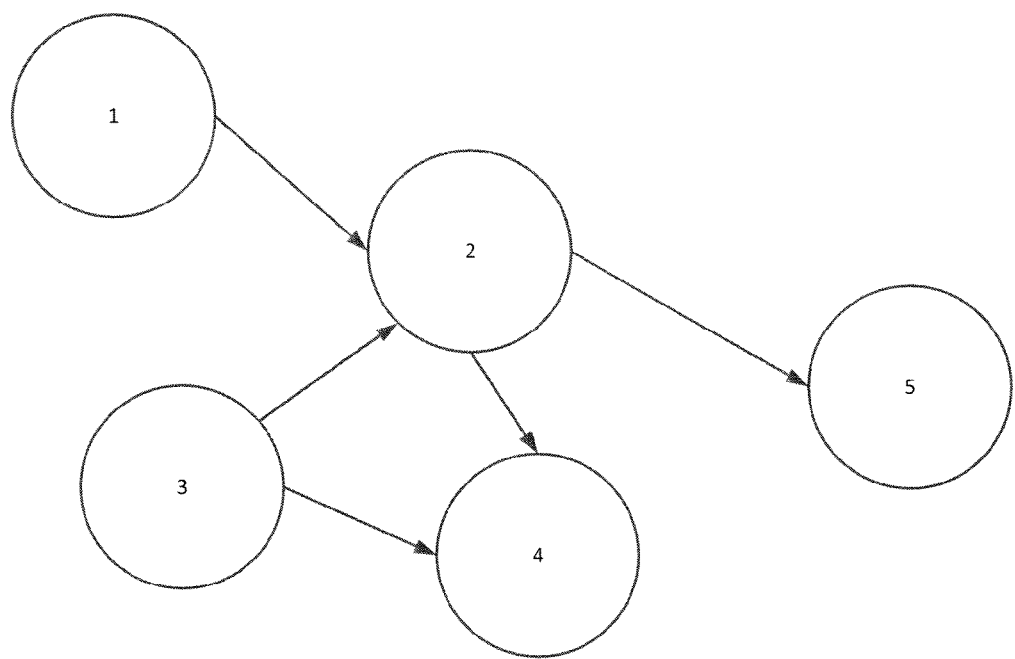
FIGS. 3a, 3b, and 3c show a configuration of alarms over time.
Figure 3B:
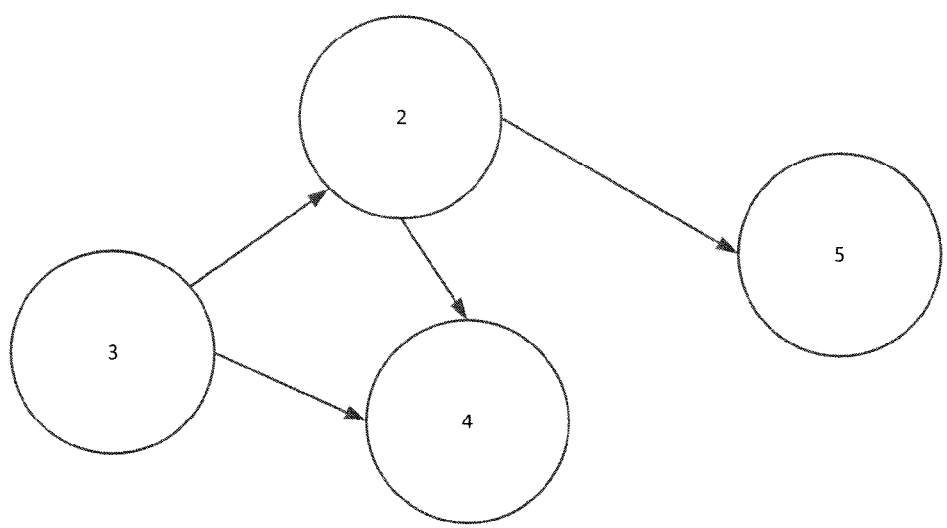
Figure 3C:
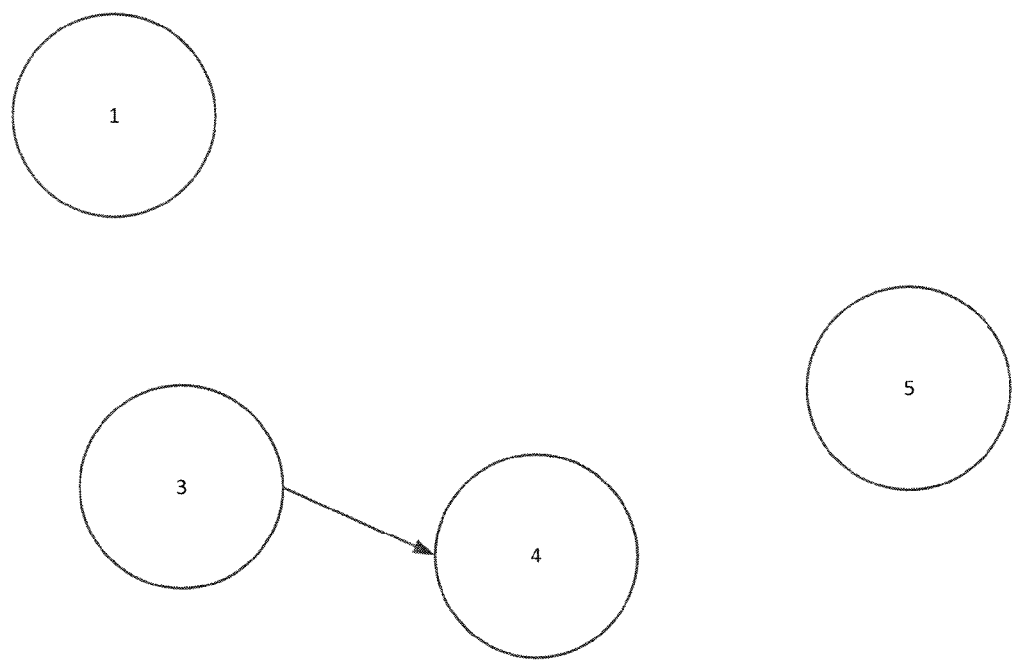

FIGS. 3a-3c show a single network of alarms comprising a plurality of alarms networked with each other. The alarms can be represented independent and in parallel. There are two types of sets, one is configuration set and the other is instance of time set for behavior. FIGS. 3a, 3b, and 3c show a single configuration set over time. It is to be appreciated that there are a plurality of configurations possible for this set (and similar sets). FIG. 3a shows an instant of time where alarms (1-5) are available including a root alarm 1. The root alarm is the alarm at the top of a hierarchy. This is called parent alarm if there are other alarms configured below the parent. Such alarms are called children alarms. Additionally, orphaned alarms are alarms that are configured in a parent/child hierarchy but due to the state of the alarm system at that instant in time there are no other alarms available to be displayed in the hierarchy so it is an orphan. FIG. 3b shows second instance of time where there is an absence of root alarm 1 (because it is no longer available) and alarm 3 is now the root alarm. FIG. 3c shows another network of alarms at another instance of time in which if alarm 2 becomes absent, alarms 1 and 5 become orphaned and 3 becomes a root alarm.

The alarms in FIG. 3a-3c are of the OLE for Process Control (OPC) type. OPC is the original name for standards specification developed in 1996 by an industrial automation industry task force, specifying the communication of real-time plant data between control devices from different manufacturers. The acronym can also stand for "Open Platform Communications" or "Open Productivity & Connectivity," which refer to the same standard.

The OPC is a non-proprietary technical specification designed to provide business applications with easy and common access to industrial plant floor data. OPC defines a common, high-performance interface that permits users to write a custom interface, or server/driver to exchange data with hardware field devices. This custom interface is written once and can then be easily reusable by Human Machine Interface (HMI), Supervisory Control and Data Acquisition SCADA, Control and custom applications.

OPC Unified Architecture, OPC UA, is an OPC industrial machine to machine communication protocol for interoperability and is the successor to OPC. OPC Alarms and Events, OPC AE, is another OPC protocol that defines the exchange of alarm and event type message information, as well as variable states and state management.

Figure 4:
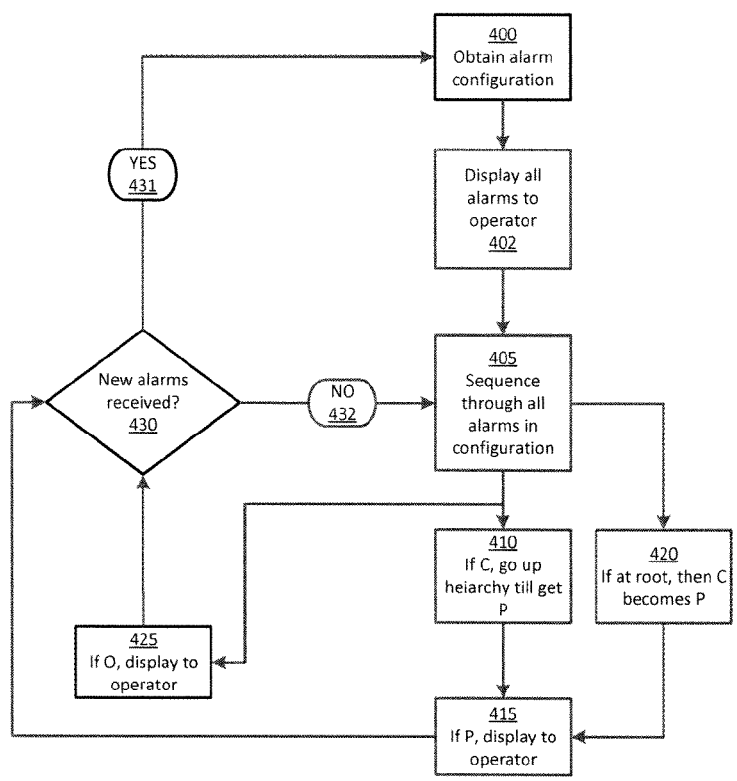
FIG. 4 shows a flow chart of the methods of dynamic alarm construction in an aspect of the disclosure.

FIG. 4 shows a flow chart of the method of dynamic alarm construction in an aspect of the disclosure. In 400, the system obtains the alarm configuration. This includes obtaining an initial hierarchy of the alarms in the network of alarms. In 402, the system displays all alarms to the operator indiscriminately in a list format. At this point, in 405, the system sequences though all the alarms in the configuration. In 410, if an alarm is a child alarm (C) then the system searches the connections of that alarm in the network of alarms until it arrives at the parent (P) of that alarm. This may include scanning other child alarms connected to the initial child alarm; however, these other child alarms are passed over by the system and no action is taken. If, as shown in 420, in searching the connections of a given child alarm, no parent alarm is obtained and the alarm is actually at the top of the hierarchy (i.e. is a root alarm), then the child alarm is relabeled as a parent alarm. Parent alarms are then displayed to the operator as shown in 415. If, in the course of searching the connections of any given alarm in the network of alarms, no additional connections are obtained, then the alarm is considered an orphan (O) alarm and is displayed to the operator, as in 425. At this point, the system checks to see if any new alarms are received (430). If this is the case (431) then the system starts the process over at 400. However, if this is not the case (432), then the system continues to monitor the network of alarms (405), in order to respond to changes in their hierarchy.

Figure 5:
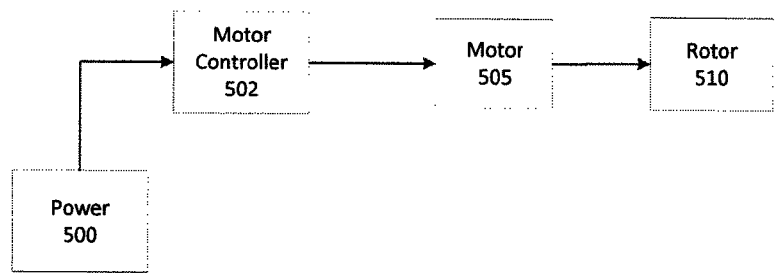
FIG. 5 shows an example use case of the methods of dynamic alarm construction in an aspect of the disclosure.

For example, referring now to FIG. 5, power 500 to a motor controller 502 is configured as a root/parent alarm and the power 500 is lost. The operator initially receives one root/parent alarm on the loss of a the motor controller power 500, and all the children alarms associated with the motor controller 502, and all the children alarms associated with the equipment driven the motor controller, for example a motor 505 connected to a rotor 510. Next, the system sequences through all of the alarms in the network of alarms and determines the hierarchy by following the method described in FIG. 4. As a result all of the children alarms associated with the motor controller and the equipment driven by the motor (for example the rotor 510) are suppressed, while the parent alarm associated with the motor control power is displayed to the operator. This aids the operator by preventing the child alarms from confusing the operator, making it easier for the operator to determine that the motor controller power failure is the problem that needs addressed.

Figure 6:
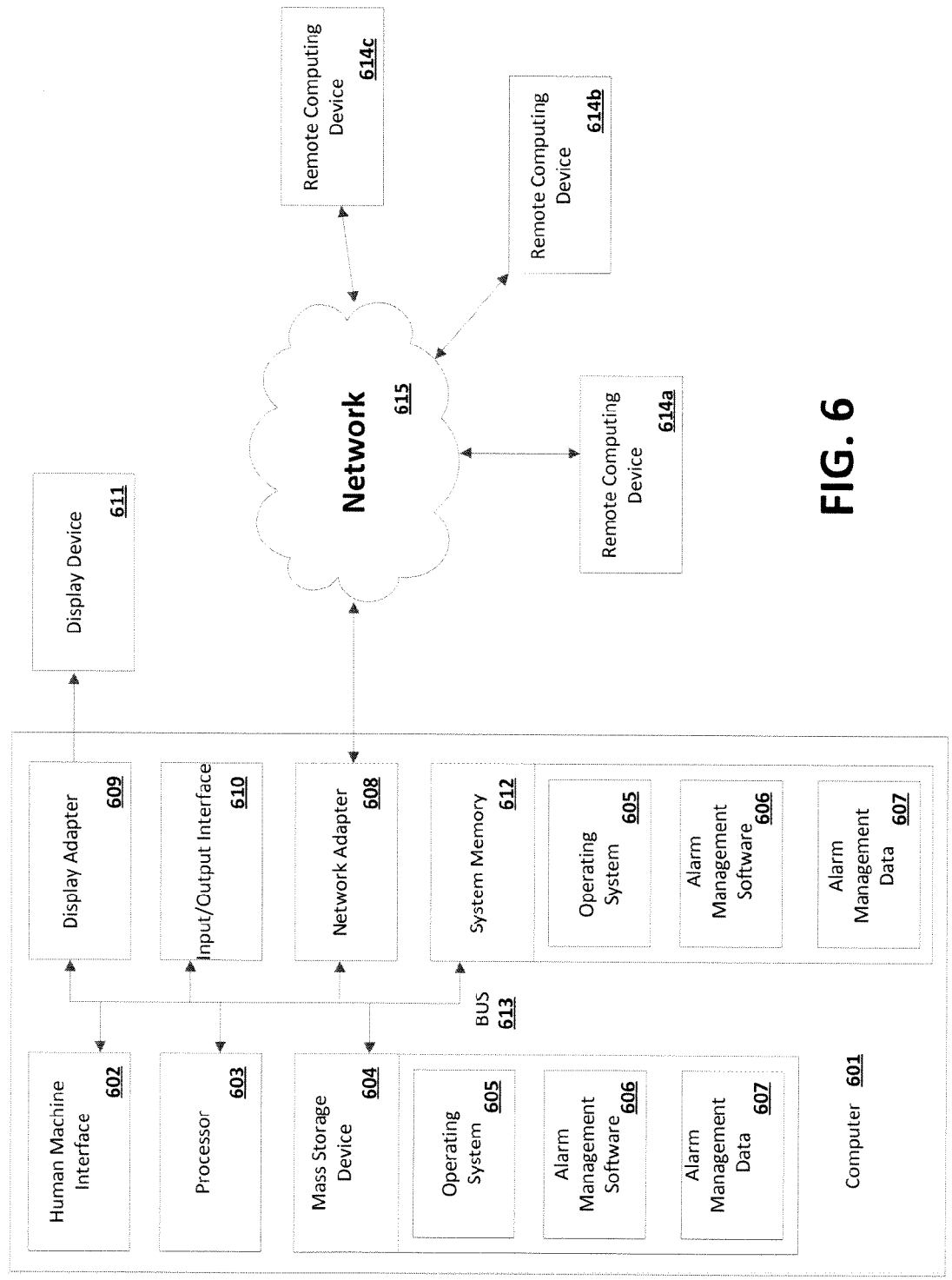
FIG. 6 is a block diagram illustrating an exemplary operating environment for performing the disclosed methods.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise the alarm management software 606 as illustrated in FIG. 6 and described below. In one exemplary aspect, the units can comprise a computer 601 as illustrated in FIG. 6, referenced above and described below.

FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise network PCs, minicomputers, mainframe computers, smart phones, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, alarm management software 606, alarm management 607, a network adapter 608, system memory 612, an input/output interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as alarm management 607 and/or program modules such as operating system 605 and alarm management software 606 that are immediately accessible to and/or are presently operated on by the processing unit 603. Alarm management software 606 can comprise computer-executable instructions to perform the steps of the methods described herein.

In another aspect, the computer 601 can also comprise other removable/non-removable, volatile/non-volatile computer storage media. By way of example, FIG. 6 illustrates a mass storage device 604 that can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and alarm management software 606. Each of the operating system 605 and alarm management software 606 (or some combination thereof) can comprise elements of the programming and the alarm management software 606. Alarm management data 607 can also be stored on the mass storage device 604. Alarm management data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computer 601 via input/output interface 610. Any step and/or result of the methods can be output in any form to an output device. Such output can be any form of visual representation, including, but not limited to, textual, graphical, animation, audio, tactile, and the like.

The computer 601 can operate in a networked environment using logical connections to one or more remote computing devices 614a,b,c. By way of example, a remote computing device can be a personal computer, portable computer, a server, a router, a network computer, a peer device or other common network node, and so on. Logical connections between the computer 601 and a remote computing device 614a,b,c can be made via a local area network (LAN) and a general wide area network (WAN). Such network connections can be through a network adapter 608. A network adapter 608 can be implemented in both wired and wireless environments. Such networking environments are conventional and commonplace in offices, enterprise-wide computer networks, intranets, and other networks 615 such as those described herein, and the Internet.

For purposes of illustration, application programs and other executable program components such as the operating system 605 are illustrated herein as discrete blocks, although it is recognized that such programs and components reside at various times in different storage components of the computing device 601, and are executed by the data processor(s) of the computer. An implementation of alarm management software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of dynamically displaying a list of alarms, the method implemented by an alarm server including at least one processor programmed to execute steps comprising:
    establishing, by the at least one processor, a first hierarchy of a first list of alarms, said first list of alarms comprising a network of alarms;
    receiving, by the at least one processor, a state of each alarm in the first list of alarms over a network, wherein the state of each alarm in the first list of alarms is received from one or more Object Linking and Embedding (OLE) for Process Control (OPC) Unified Architecture (UA) clients through a standard interface of an Object Linking and Embedding for Process Control (OPC) Alarms and Events (OPC AE) protocol, communicating with the at least one processor;
    dynamically changing, by the at least one processor automatically in response to the received state of each alarm in the first list of alarms, the first hierarchy of the first list of alarms to obtain a second hierarchy of a second list of alarms; and
    presenting, by the at least one processor on a display in communication with the at least one processor, the second list of alarms to an operator based on the second hierarchy.

2. The method of claim 1, further comprising presenting the first list of alarms to the operator based on the state of the alarms and the first hierarchy.

3. The method of claim 1 wherein the network of alarms comprises a plurality of alarms connected with each other.

4. The method of claim 1 where in the network of alarms comprises series and in parallel connections between the alarms.

5. The method of claim 1 wherein the state of the alarms comprises an availability of the alarms in the network of alarms.

6. The method of claim 1 wherein the second list of alarms comprises less alarms than the first list of alarms.

7. The method of claim 1, wherein establishing a first hierarchy of a first list of alarms in an alarm server, said first list of alarms comprising the network of alarms, comprises identifying each alarm as having a parent, child or orphan relationship.

8. The method of claim 7, wherein dynamically changing the first hierarchy of the first list of alarms to obtain a second hierarchy of a second list of alarms comprises changing, by the at least one processor automatically in response to the received state of each alarm in the first list of alarms, one or more of the parent, child or orphan relationships identified in the first hierarchy of the first list of alarms.

9. The method of claim 8, wherein presenting, on the display, a second list of alarms to an operator based on the second hierarchy comprises presenting those alarms that have a parent or orphan relationship in the second hierarchy.

10. An industrial process control system comprising:
    a computing device, said computing device having at least a processor and a memory, wherein the processor executes computer-executable instructions stored in the memory, said computer-executable instructions cause the processor to:
    establish a first hierarchy of a first list of alarms in an alarm server, said first list of alarms comprising the network of alarms;
    receive a state of each alarm in the first list of alarms over a network, wherein the state of each alarm in the first list of alarms is received from one or more Object Linking and Embedding (OLE) for Process Control (OPC) Unified Architecture (UA) clients through a standard interface of an Object Linking and Embedding for Process Control (OPC) Alarms and Events (OPC AE) protocol, communicating with the computing device;
    dynamically change, by the processor automatically in response to the received state of each alarm in the first list of alarms, the first hierarchy of the first list of alarms to obtain a second hierarchy of a second list of alarms; and
    present, on a display in communication with the computing device, the second list of alarms to an operator based on the second hierarchy.

11. The system of claim 10, wherein the computing device comprises an alarm server.

12. The system of claim 10, further comprising the processor executing computer-executable instructions stored in the memory that cause the processor to present the first list of alarms to the operator based on the state of the alarms and the first hierarchy.

13. The system of claim 12, wherein the second list of alarms comprises less alarms than the first list of alarms.

14. The system of claim 10, wherein the state of the alarms comprises an availability of the alarms in the network of alarms.

15. The system of claim 10, wherein establishing a first hierarchy of a first list of alarms in an alarm server, said first list of alarms comprising the network of alarms, comprises identifying each alarm as having a parent, child or orphan relationship.

16. The system of claim 15, wherein dynamically changing, by the alarm server, the first hierarchy of the first list of alarms based on the state of the first list of alarms to obtain a second hierarchy of a second list of alarms comprises changing one or more of the parent, child or orphan relationships identified in the first hierarchy of the first list of alarms.

17. The system of claim 16, wherein presenting, on the display in communication with the alarm server, a second list of alarms to an operator based on the second hierarchy comprises presenting those alarms that have a parent or orphan relationship in the second hierarchy.

18. A non-transitory computer-readable medium comprising computer-executable instructions for dynamically displaying a list of alarms, wherein when executed by at least one processor, said computer-executable instructions comprising instruction for cause the at least one processor to execute steps including:

establishing a first hierarchy of a first list of alarms, said first list of alarms comprising a network of alarms;

receiving a state of each alarm in the first list of alarms over a network, wherein the state of each alarm in the first list of alarms is received from one or more Object Linking and Embedding (OLE) for Process Control (OPC) Unified Architecture (UA) clients through a standard interface of an Object Linking and Embedding for Process Control (OPC) Alarms and Events (OPC AE) protocol, communicating with the alarm server;

dynamically changing, by the at least one processor automatically in response to the received state of each alarm in the first list of alarms, the first hierarchy of the first list of alarms based on the state of the first list of alarms to obtain a second hierarchy of a second list of alarms; and presenting, on a display in communication with the at least one processor, the second list of alarms to an operator based on the second hierarchy.

19. The computer-readable medium of claim 18, wherein the computer-executable instructions are executed by an alarm server.

20. The computer-readable medium of claim 18, wherein establishing a first hierarchy of a first list of alarms, said first list of alarms comprising the network of alarms, comprises identifying each alarm as having a parent, child or orphan relationship and wherein dynamically changing the first hierarchy of the first list of alarms based on the state of the first list of alarms to obtain a second hierarchy of a second list of alarms comprises changing one or more of the parent, child or orphan relationships identified in the first hierarchy of the first list of alarms.

* * * * *